US008874494B1

(12) United States Patent  (10) Patent No.: US 8,874,494 B1
Evans  (45) Date of Patent: Oct. 28, 2014

(54) DYNAMIC SELECTION OF SPARE STORAGE ELEMENT TYPES IN ARRAY

(71) Applicant: EMC Corporation, Hopkinton, MA (US)

(72) Inventor: T. David Evans, Rutland, MA (US)

(73) Assignee: EMC Corporation, Hopkinton, MA (US)

( * ) Notice: Subject to any disclaimer, the term of this patent is extended or adjusted under 35 U.S.C. 154(b) by 245 days.

(21) Appl. No.: 13/629,953

(22) Filed: Sep. 28, 2012

(51) Int. Cl.
G06F 15/18 (2006.01)

(52) U.S. Cl.
USPC ............... 706/12; 706/15; 706/46; 714/6.32; 714/6.2

(58) Field of Classification Search
None
See application file for complete search history.

(56) References Cited

U.S. PATENT DOCUMENTS

| 6,571,354 | B1 * | 5/2003 | Parks et al. | 714/6.32 |
| 6,598,174 | B1 * | 7/2003 | Parks et al. | 714/6.22 |
| 8,010,475 | B2 * | 8/2011 | Zhao et al. | 706/46 |
| 2005/0015653 | A1 * | 1/2005 | Hajji et al. | 714/6 |
| 2010/0094786 | A1 * | 4/2010 | Gupta et al. | 706/12 |
| 2012/0041914 | A1 * | 2/2012 | Tirunagari | 706/15 |

OTHER PUBLICATIONS

"Adaptive Fault-Tolerant Architecture for Unreliable Technologies With Heterogeneous Variability" Nivard Aymerich, Sorin D. Cotofana, Senior Member, IEEE, and Antonio Rubio, Senior Member, IEEE IEEE Transactions on Nanotechnology, vol. 11, No. 4, Jul. 2012.*

Rummery et al., "On-Line Q-Learning Using Connectionist Systems," Cambridge University Engineering Department, England, Sep. 1994, 21 pages.

Sutton & Barto, "Reinforcement Learning: An Introduction," The MIT Press, Cambridge, MA, downloaded from http://webdocs.cs.ualberta.ca/~sutton/book/ebook/the-book.html, particularly section 7.5 "Sarsa," viewed at http//webdocs.cs.ualberta.ca/!sutton/book/ebook/node77.html, downloaded on Oct. 1, 2012.

* cited by examiner

Primary Examiner — Kakali Chaki
Assistant Examiner — Luis Sitiriche
(74) Attorney, Agent, or Firm — BainwoodHuang

(57) ABSTRACT

An improved technique for replacing storage elements in a redundant group of storage elements of a storage array dynamically selects a storage element type from among multiple candidates based on which storage element type produces the greatest service level of the redundant group. The technique includes selecting one of multiple storage element types using a random selection process that can be biased to favor the selection of certain storage element types over others. A storage element of the selected type is added to the redundant group. The selected storage element type is then rewarded based on the service level that results from adding the storage element of the selected type. The selection process is repeated, and a newly selected storage element type is put into use. Operation tends to converge on an optimal storage element type that maximizes the service level of the redundant group.

19 Claims, 3 Drawing Sheets

DYNAMIC SELECTION OF SPARE STORAGE ELEMENT TYPES IN ARRAY

BACKGROUND

Conventional storage arrays make use of a variety of device types for storing data. Such device types include Fibre Channel disk drives, SATA disk drives, and solid state drives (SSDs) of various speeds, for example.

As is known, storage arrays commonly include "redundant groups" of storage elements, i.e., groups of storage elements bound together with some level of redundancy among the group members, such that some number of storage elements can fail without the redundant group as a whole suffering permanent data loss. The "storage elements" that form a redundant group are disk drives, SSDs, other drive types, portions thereof, or combinations of any of the foregoing. Common examples of such redundant groups include certain RAID groups (RAID is an acronym for Redundant Array of Independent Disks), as well as other redundant storage groupings. A storage array typically includes many such redundant groups. A typical redundant group may include "N" different storage elements. Erasure coding is applied to the data on the storage elements to provide fault tolerance, such that the redundant group can suffer the loss of any N-K storage elements and continue to function normally, i.e., as long as at least "K" storage elements remain. With each storage element lost to a failure, however, the fault tolerance of the redundant group decreases, as the redundant group can suffer fewer losses of storage elements before permanent data loss occurs.

Typically, when a storage element of a redundant group fails, the array reaches into a reserve of storage devices (e.g., disk drives and/or SSD's, which are kept on standby) and creates a spare storage element from those devices to replace the failed element. The array then typically repairs the redundant group, by binding the selected spare storage element to the redundant group, regenerating data for the failed storage element from the remaining operating storage elements, and storing the regenerated data on the spare. With the failed storage element replaced and the data from the failed storage element regenerated, the fault tolerance of the redundant group is restored to its original value. Typically, failed storage elements are replaced with spare storage elements that are exact matches, i.e., that have the same size, speed, and device type as the failed storage elements.

SUMMARY

We have recognized that replacing failed storage elements with exact matches from a set of spares on an array is not always the optimal choice. For example, an exact match may not be available. In some cases, a spare storage element can be used that is faster than the one that failed without any loss of performance. In other cases, a slower spare can be used, e.g., where performance is not critical. Yet conventional arrays do not provide flexibility in replacing failed storage elements.

In contrast with the conventional approach, an improved technique for replacing storage elements in a redundant group of storage elements of a storage array dynamically selects a storage element type from among multiple candidates based on which storage element type produces the greatest service level of the redundant group. The "service level" of the redundant group is a measure of its performance, fault tolerance, or a combination thereof. The technique includes selecting one of multiple storage element types using a random selection process that can be biased to favor the selection of certain storage element types over others. A replacement storage element of the selected type is added to the redundant group. The redundant group is operated, and the service level of the redundant group is monitored. The selected storage element type is then rewarded based on the service level detected, i.e., a biasing of the selection process is modified to change the likelihood that the selected storage element type will again be selected in the future. The selection process is repeated, and a newly selected storage element type is put into use. Each time a new selection is made, the service level is monitored and the selected storage element type is rewarded in response to the service level that results. In this fashion, operation tends to converge on an optimal storage element type that maximizes the service level of the redundant group.

Certain embodiments are directed to a method of replacing storage elements in a storage array. The method includes selecting, in accordance with a selection process, one of multiple storage element types for replacing a storage element in a redundant group of storage elements of the storage array. The selection process has a biasing that is adjustable to change the probability of selecting any of the storage element types relative to the others. The method further includes adding a storage element of the selected storage element type to the redundant group and operating the redundant group with the added storage element of the selected storage element type. The method also includes calculating a service level of the redundant group in response to operating the redundant group with the added storage element of the selected storage element type and adjusting the biasing of the selection process, in response to calculating the service level of the redundant group after selecting the selected storage element type, to vary the probability that the selected storage element type will later be selected according to the selection process when subsequently selecting one of the storage element types for replacing a storage element of the redundant group.

Other embodiments are directed to computerized apparatus and computer program products. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same parts throughout the different views. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for replacing storage elements in a redundant group of storage elements of a storage array dynamically selects a storage element type from among multiple candidates based on which storage element type produces the greatest service level of the redundant group.

Figure 1:
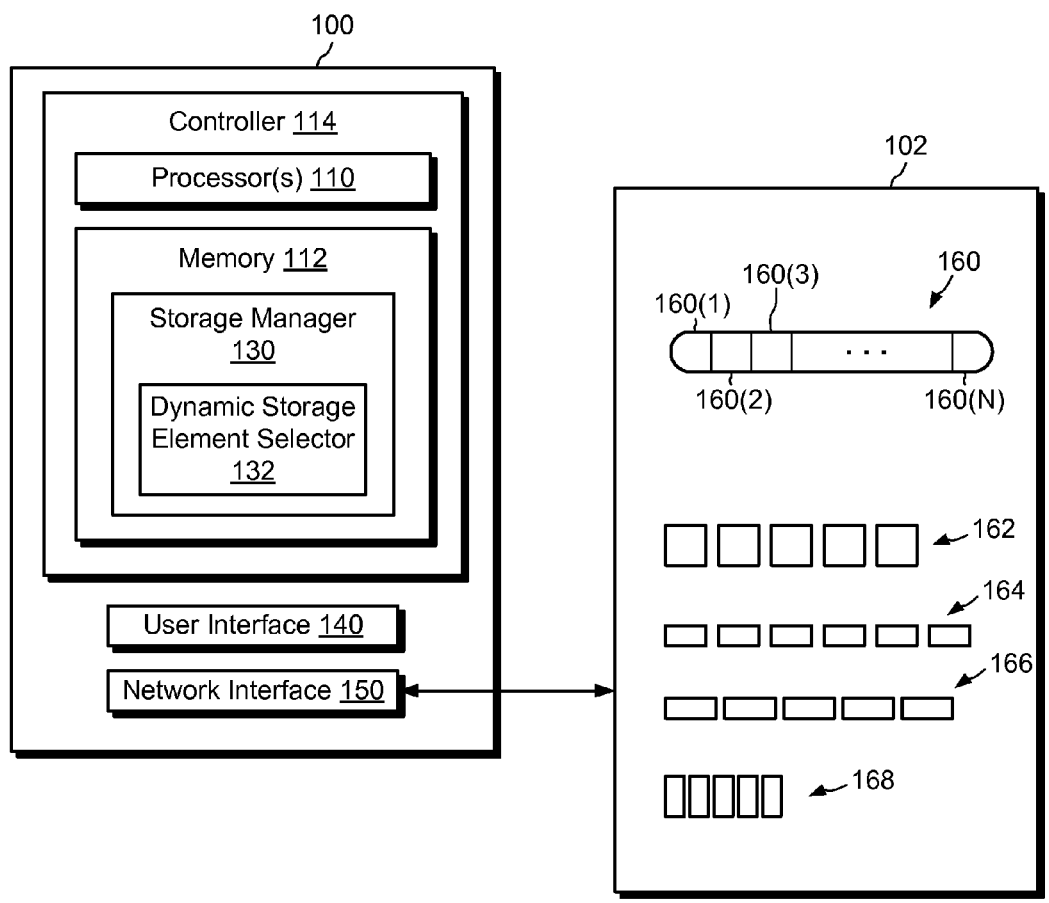
FIG. 1 is block diagram of an example environment, including computing circuitry and a storage array, in which an improved technique for replacing storage elements in the storage array can be practiced.

FIG. 1 shows example computing circuitry 100 in which an improved technique for replacing storage elements in an array 102 can be conducted. The computing circuitry 100 includes a set of processors 110 (e.g., one or more processing chips and/or assemblies), memory 112, a user interface 140, and a network interface 150. The user interface 140 includes, for example, a keyboard, pointer, and display. The set of processors 110 executing instructions stored in the memory 112 forms a controller 114, which is constructed and arranged to perform various processes described herein. The memory 112 includes both volatile and non-volatile memory. The memory 112 stores instructions for realizing a storage manager 130. The storage manager 130 includes a dynamic storage element selector 132. It is understood that the memory 112 may store a myriad of other constructs; however, these are omitted from FIG. 1 for the sake of simplicity. The various elements of the computing circuitry 100 may be disposed at a single location or distributed across multiple locations, e.g., over a network. Further, although the computing circuitry 100 is shown separately from the array 102, it is understood that alternative embodiments may provide the computing circuitry 100 within the array 102.

The example array 102 includes a redundant group 160. The redundant group 160 is composed of multiple storage elements 160(1) through 160(N). At the time the storage elements 160(1) through 160(N) are bound to the redundant group 160, the storage elements 160(1) through 160(N) are all of the same size (storage capacity). However, the storage elements 160(1) through 160(N) can be composed from any device types, e.g., Fibre Channel, SATA, medium speed SSD, fast SSD, etc., in any combination and of any speed. Where the redundant group 160 is composed of storage elements having different speeds, the redundant group 160 as a whole is only as fast as its slowest storage element.

In an example, the storage elements 160(1) through 160(N) are erasure coded, such that the redundant group 160 can lose up to N-K storage elements to failures and continue to operate without data loss. Although a single redundant group 160 is shown, it is understood that the array 102 may include any number of redundant groups.

The array 102 keeps a number of storage elements on hand to serve as replacements in the event that any of the storage elements 160(1) through 160(N) of the redundant group 160, or storage elements of redundant groups not pictured, fails or otherwise is brought out of service. For example, storage elements 162 are composed from storage devices of a first type (e.g., Fibre Channel). Similarly, storage elements 164 are composed of storage devices of a second type (e.g., SATA), storage elements 166 are composed from storage devices of a third type (e.g., medium speed SSD), and storage elements 168 are composed from storage devices of a forth type (e.g., fast SSD). Although four device types are shown, it is understood that various implementations may employ a greater or fewer number of device types, and that it is not essential that implementations include the particular device types shown.

In example operation, the array 102 stores data using the redundant group 160. One of the storage elements 160(1) through 160(N) of the redundant group 160 then fails. In response to the failure, the storage manager 130 operates the dynamic storage element selector 132 to select a type of storage element from among the types 162, 164, 166, and 168 for replacing the failed storage element. Another possible selection of the dynamic storage element selector 132 is to select no action, i.e., to elect not to swap in a replacement of any kind Assuming a storage element type is selected, the storage manager 130 adds a spare storage element having the selected device type to the redundant group 160. Data previously stored on the failed storage element may then be regenerated and written the newly added spare, to restore the fault tolerance of the redundant group 160 to its initial level.

In selecting a storage element type, the dynamic storage element selector 132 applies a random, biased selection process. Each storage element type is associated with a weight, and all of the storage element types together form a weighted set. The selection process selects a storage element type by randomly selecting within the weighted set, such that storage element types having greater weights are more likely to be selected than storage element types having lesser weights.

With the spare storage element in place, the storage manager 130 monitors the service level of the redundant group 160, i.e., the performance and/or fault tolerance of the redundant group 160. In an example, performance is measured as the throughput of the redundant group 160 and/or as the number of IOs per second (IOPS) processed by the redundant group 160. Fault tolerance is measured as the level of redundancy of the redundant group, i.e., the number of storage elements that can fail without causing permanent data loss. In an example, performance and fault tolerance are expressed as scores, and the scores are combined (e.g., via a weighted sum) to yield a quantitative measure of service level. The selected storage element type (or the option to select no replacement) is then rewarded in relation to the effect it has on the service level. If the selected storage element type results in a high service level, it is rewarded and made more likely to be selected going forward.

The acts of selecting a storage element type in response to a failure, monitoring the service level, and rewarding the selected storage element type are repeated over and over again, e.g., in a loop. Over the course of many iterations, a particular storage element type tends to be rewarded more than the others. As the most rewarded storage element type also tends to be the one that is selected most often, operation tends to converge on the best storage element type for the circumstances.

Those skilled in the art may understand the term "service level" customarily to include not only performance and fault tolerance, but also capacity. Although the capacity of the redundant group 160 may also be considered in assessing its service level, in many cases the redundant group 160 has a fixed capacity. In some examples, a rule is put in place that no replacement storage element is allowed to reduce the storage capacity of the redundant group (e.g., the selected spare must be large enough to meet the capacity requirement of the redundant group). With this rule in place, capacity as a factor of service level can be ignored. However, other implementations can be constructed in which the capacity of the redundant group 160 is allowed to change over time. In such alternative implementations, capacity may also be considered as a factor in defining the service level for purposes of this technique.

Figure 2:
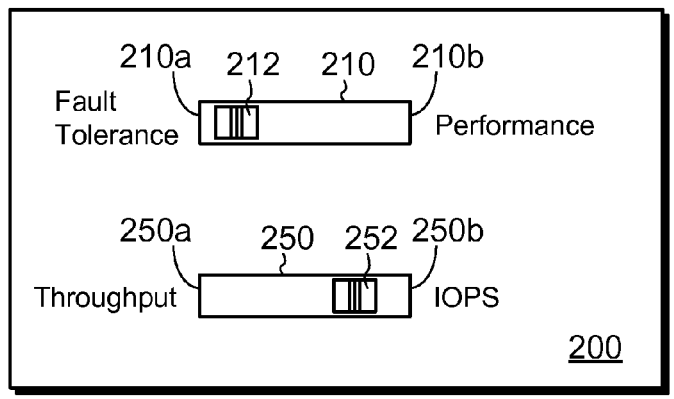
FIG. 2 is a screen display of example user input objects for receiving user input by the computing circuitry of FIG. 1.

FIG. 2 shows an example graphical display 200 of the computing circuitry 100, which may be provided, for example, in a window rendered on a display of the user interface 140. Here, controls 210 and 250 are provided for receiving user input. A user of the computing circuitry 100 can operate the controls 210 and 250 to specify the relative importance of different characteristics in defining a service level of the redundant group 160.

Control 210 includes a slider 212, which a user can adjust between a first end 210a and a second end 210b to specify the relative importance of fault tolerance of the redundant group 160 versus performance of the redundant group 160. For example, the user can position the slider 212 at the first end 210a to indicate that fault tolerance is critical while performance is completely unimportant. Similarly, the user can position the slider 212 at the second end 210b to indicate that performance is critical while fault tolerance is completely unimportant. Likewise, the user can position the slider 212 between the first end 210a and the second end 210b to indicate some balance between the relative importance of fault tolerance and performance in defining the service level of the redundant group 160. Based on the user-indicated position of the slider 212, a weight $\Omega_P$ is assigned for performance and a weight $\Omega_F$ is assigned for fault tolerance. Each weight varies between zero and one, and the sum of the weights $\Omega_P+\Omega_F$ equals one. Visually, the weight $\Omega_F$ corresponds to the distance from the first end 210a to the slider 212 and the weight $\Omega_P$ corresponds to the distance between the slider 212 and the second end 210b.

With the user-established position of the slider 212 of the control 210 established, the service level of the redundant group 160 can be defined as follows:

$$\text{Service Level}=P\Omega_P+F\Omega_F, \quad (1)$$

where "P" is the actual performance of the redundant group 160 and "F" is the actual fault tolerance of the redundant group 160. Actual performance of the redundant group 160 can typically be obtained directly from the array 102, which collects performance metrics. In an example, actual fault tolerance can be obtained from the array 102 based on the erasure coding of the redundant group 160 and the number (if any) of failed storage elements of the redundant group 160 that have not been repaired. For example, if the redundant group 160 includes N storage elements and can continue to run without data loss with as few as any K storage elements, then the actual fault tolerance of the redundant group 160 is proportional to N-K. If M storage elements fail and no action is taken to replace them, however, then the fault tolerance of the redundant group 160 drops and is proportional to N-M-K. Those skilled in the art will appreciate, however, that fault tolerance can be measured in a variety of ways. Also, redundant groups may achieve redundancy with techniques other than erasure coding, and fault tolerance can be measured for such redundant groups in whatever way is appropriate for the particular arrangement.

In some examples, the graphical display 200 also includes a second control 250 to resolve the performance characteristic (P) into two components—throughput and IOPS. The control 250 includes a slider 252 that the user can adjust to specify the relative importance of throughput versus IOPS of the redundant group 160. Throughput can be measured in various ways and is typically expressed as a number of bytes per second written and/or read by the redundant group 160. IOPS refers to the number of IO requests (e.g., READ requests and WRITE requests) handled by the redundant group 160 every second. Here, it is recognized that certain use cases perform better when throughput is maximized whereas others perform better when IOPS are maximized. Still others perform better when a particular balance is struck between the two. In a manner similar to that described for the control 210, the control 250 can be adjusted to establish a desired balance between throughput and IOPS in establishing the performance of the redundant group 160.

Based on the user-selected position of the slider 252, a weight $\Omega_T$ is assigned for throughput and a weight $\Omega_I$ is assigned for IOPS. Each weight varies between zero and one, and the sum of the weights $\Omega_T+\Omega_I$ equals one. Visually, the weight $\Omega_T$ corresponds to the distance from the first end 250a to the slider 252 and the weight $\Omega_I$ corresponds to the distance between the slider 252 and the second end 250b.

With the position of the slider 252 of the control 250 established, the performance (P) of the redundant group 160 can be defined as follows:

$$P=T\Omega_T+I\Omega_I, \quad (2)$$

where "T" is the actual throughput of the redundant group 160 and "I" is the actual IOPS of the redundant group 160, as obtained from the array 102. The above definition of service level of the redundant group 160 can then be updated as follows:

$$\text{Service Level}=(T\Omega_T+I\Omega_I)\Omega_P+F\Omega_F \quad (3)$$

Although service level is explicitly defined here based on certain factors, including some that are user-adjustable, it is understood that this is merely an example. Service level may alternatively be "hard coded" as a particular balance of factors. Such factors may not be amenable to user adjustment. Also, service level may be based on a single factor only (e.g., fault tolerance or IOPS), based on any combination of fault tolerance, throughput, and IOPS, or based on other factors. It is therefore understood that the term "service level" is intended to be interpreted broadly to include any of a variety of factors or combination of factors.

Figure 3:
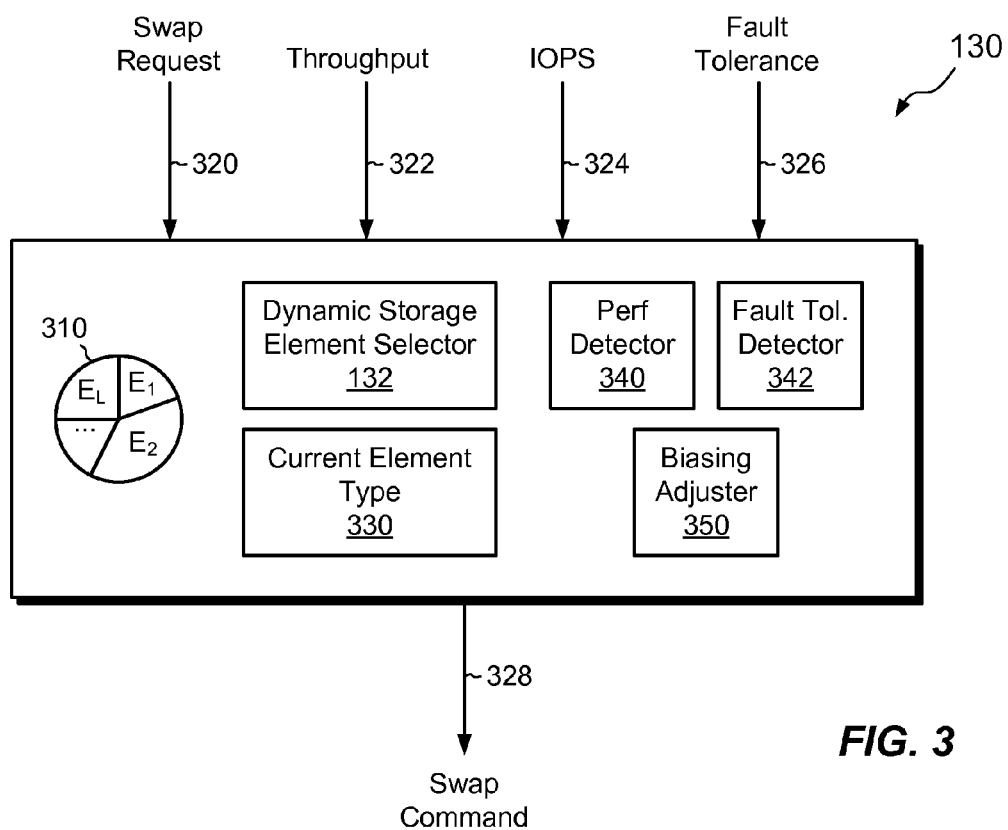
FIG. 3 is a block diagram of an example storage manager of the computing circuitry of FIG. 1.

FIG. 3 shows an example implementation of the storage manager 130 in additional detail. Here, it is seen that the storage manager 130 includes the dynamic storage element selector 132, as well as a record 310 of storage element types ($E_1$-$E_L$), a current element type 330, a performance detector 340, a fault tolerance detector 342, and a biasing adjuster 350. The storage element types $E_1$-$E_L$ identify categories of storage elements (e.g., Fiber Channel, SATA, medium speed SSD, and fast SSD) and correspond to the categories 162, 164, 166, and 168 of spare storage element types in the array 102. In some examples, the storage element types $E_1$-$E_L$ includes a "null type," i.e., a choice not to replace the failing storage element. Selecting the null type may be preferred in some examples, such as where the redundant group 160 requires high performance but no available replacement is fast enough the meet performance requirements. In these examples, it may be better to suffer a reduction in fault tolerance than to impair performance.

Each of the storage element types $E_1$-$E_L$ in the record 310 is associated with a weight. Storage element types receiving more and/or higher rewards tend to have larger weights, whereas storage element types receiving fewer and/or lesser rewards tend to have smaller weights. Weights of the storage element types $E_1$-$E_L$ may be set with any suitable initial values. For instance, weights for all of storage element types $E_1$-$E_L$ may initially be set to be the same values, to random values, or to values that reflect prior performance.

It is also seen from FIG. 3 that the storage manager 130 receives a first input signal 320 indicating a swap request. In an example, the swap request 320 originates from the array 102 and conveys a request to swap one of the storage elements 160(1)-160(N) of the redundant group 160. In an example, the swap request 320 is produced in response to a failure of one of the storage elements 160(1)-160(N). The storage manager 130 is also seen to receive a second input signal 322 indicating the throughput of the redundant group 160 (e.g., the value T from EQ. (2)) and a third input signal 324 indicating the number of IOPS of the redundant group 160 (e.g., the value of I from EQ. (2)). In an example, the throughput signal 322 and IOPS signal 324 originate from the array 102, which collects throughput and IOPS metrics pertaining to the redundant group 160. The storage manager 130 is further seen to include a fourth signal 326, which indicates a fault tolerance of the redundant group 160. In an example, the fault tolerance signal originates from the array 102 and corresponds to the value of F in EQ. (1). In response to receiving the first through fourth inputs 320, 322, 324, and 326, the storage manager 130 generates an output signal 328, which designates a swap command. The swap command 328 is conveyed to the array 102 and identifies the selected storage element type (i.e., one of $E_1$ to $E_L$) to be swapped in to replace the failed storage element.

In operation, the dynamic storage element selector 132 selects one of the storage element types $E_1$-$E_L$ for replacing the failed storage element in the redundant group 160. The selection process is random but has a biasing based on the weights associated with the different storage element types. In an example, the probability of the dynamic storage element selector 132 selecting any given storage element type is equal to the weight associated with that storage element type divided by the sum of all the weights for all of the storage element types. Although the dynamic storage element selector 132 applies a random selection process, the probability of selecting storage element types with higher weights is greater because they are more highly represented in the weighted set.

The following example helps to illustrate the operation of the selection process employed by the dynamic storage element selector 132. In this particular example, it is assumed that there are four storage element types and their weights are as follows:

| Protocol | Weight |
|---|---|
| $E_1$ | 50 |
| $E_2$ | 2000 |
| $E_3$ | 300 |
| $E_4$ | 70 |

Here, the probability of the dynamic storage element selector 132 selecting element type $E_1$ is 50 divided by 2420 (the sum of the weights), or 0.021, the probability of selecting $E_2$ is 2000/2420, or 0.83, and so forth.

The dynamic storage element selector 132 may operate to select a storage element type in any suitable way. In one example, the storage element types $E_1$ to $E_4$ are represented as contiguous ranges of weights, which span from 1 to 2420 (the sum of the weights). For instance, a range for $E_1$ extends from 1 to 50, a range for $E_2$ extends from 50 to 2050, a range for $E_3$ extends from 2050 to 2350, and a range for $E_4$ extends from 2350 to 2420. The dynamic storage element selector 132 calculates a random number between 1 and 2420. The dynamic storage element selector 132 then identifies the selected protocol as the one that corresponds to the range into which the calculated random number falls. Thus, if the random number is calculated to be 2101.5234, the dynamic storage element selector 132 selects storage element type $E_3$, because 2101.5234 falls in the range assigned to $E_3$ (from 2050 to 2350).

The current element type 330 stores the storage element type most recently selected by the dynamic storage element selector 132. A storage element of the current element type 330 (i.e., a spare of the selected type) is then added to the redundant group 160 and the redundant group 160 is operated. The performance detector 340 monitors the throughput signal 322 and/or the IOPS signal 324, and the fault tolerance detector 342 monitors the fault tolerance signal 326, all with the spare of the selected storage element type 330 in place within the redundant group 160. The biasing adjuster 350 computes the resulting service level, e.g., using EQ. (1) or EQ. (3), and adjusts the weights of the storage element types $E_1$ to $E_L$ stored in the record 310 based on the computed value of the service level. In an example, a weight of the selected storage element type is adjusted by applying a reward, and the reward is greater when the computed service level is greater.

The dynamic storage element adjuster 350 can apply rewards with any suitable timing. In one example, the dynamic storage element adjuster 350 applies a reward each time the swap request signal 320 indicates that one of the storage elements 160(1) to 160(N) has failed. Rewards are thus applied just prior to making a new selection, based on performance and fault tolerance data accumulated since the last time a storage element was replaced. In other examples, rewards are administered with other timing, such as after some predetermined number of assertions of the swap request signal 320.

The administration of rewards can be effected in a number of ways. In one example, a reward is implemented simply by adding a number (e.g., 1) to the weight associated with the selected storage element type. In another example, rewards are implemented by increasing weights associated with selected storage element types by a percentage. For instance, rewards can each operate by increasing the weight of a selected storage element type by 1%. In some examples, the values of the weights increase in proportion to the computed service level. Thus, a selected storage element type will receive a greater reward if its selection results in a higher service level.

Over time, for any given computing environment, it is expected that one of the storage element types $E_1$-$E_N$ will come to predominate over the others. Over multiple iterations, operation will thus tend to converge on a particular storage element type. Convergence maximizes use of the best storage element type for the circumstances, but it can also prevent recovery and establishment of a new predominant storage element type if circumstances change. For example, if the weight of one storage element type is 1,000,000 and the weights of the others are all 0, the technique will not be able to recover and select a different storage element type, even if new circumstances favoring the new storage element type arise, as storage element types with weights of 0 will never be selected.

In an example, this inability of the technique to adapt is avoided by limiting the minimum size of weights. For example, the biasing adjuster 350 may require no weight to fall below 5% of the sum of all the weights. Limiting the minimum weights in this manner ensures that the technique can adapt as circumstances change. For example, a storage element type that previously performed poorly can still be selected, at least some of the time, and can eventually come to predominate over the other storage element types if it performs better than the other storage element types.

In some implementations, the storage manager 130 selects and rewards storage element types according to a formal reinforcement learning technique. Many such techniques are known; however, we have recognized that the SARSA λ technique is particularly well-suited for controlling the selection of data replacement protocols in a cache. SARSA is an acronym for State-Action-Reward-State-Action. A theoretical development of the SARSA λ technique can be found in "Reinforcement Learning: An Introduction," by Richard S. Sutton and Andrew G. Barto, MIT Press, Cambridge, Mass., 1998.

According to an example SARSA λ implementation, we define a state variable "s" as representing a set of possible values of factors contributing to the service level of the redundant group 160. In one example, s is defined three-dimensionally as a combination of throughput values, IOPS values, and fault tolerance values. For example, throughput, IOPS, and fault tolerance are each represented on a scale of 1 to 10, with "1" representing the lowest value of the represented characteristic and "10" representing the highest value. Considering all combinations would then yield a total of 1000 possible states, i.e., 10 values of throughput time 10 values of IOPS times 10 values of fault tolerance.

It is understood that the number of dimensions of the state space reflects the number of factors considered in assessing the service level of the redundant group 160. The number of dimensions that make up the state space can thus be increased if additional factors are considered (e.g., capacity). Also, the number of dimensions can be decreased if fewer factors are considered (e.g., fault tolerance and IOPS only).

In providing the example SARSA λ implementation, we also define an action variable "a" as the selection of a storage element type to be used in replacing a failed storage element in the redundant group 160. Thus, if the record 310 of storage element types identifies a total of L different protocols, we have a total of L possible values for the action variable a, one for each storage element type. We can refer to each selection of a storage element type as a "play."

Further, we define a state-action pair "(s, a)" as the concurrence of a particular value of the state variable s (i.e., a particular combination of throughput value, IOPS value, and fault tolerance value) with a particular action (storage element type selection). As there are 1000 different states and L different actions, we have a total of 1000*L unique state-action pairs. A policy "π" defines a mapping of each state-action pair (s, a) to the probability of taking an action while in the given state. Each state-action pair has a value, "$Q^\pi(s, a)$," which represents the average reward expected when taking action a in state s in accordance with the policy π.

A reward variable "r" is assigned a value based on the service level that results from selection of a particular state-action pair. In an example, the reward variable r is computed based the service level using the following equation:

$$r = \text{Service Level} = (T\Omega_T + I\Omega_I)\Omega_P + F\Omega_F. \quad (4)$$

Here, the terms are the same as those used above in EQ. (3). Values of T, I, and F are actual values (or scores) for throughput, IOPS, and fault tolerance, respectively, as obtained by the storage manager 130. Values $\Omega_T$, $\Omega_I$, $\Omega_P$, and $\Omega_F$ are obtained, for example, from the user controls 210 and 250.

From EQ. (4), the reward r equals the computed service level. In other examples, however, the reward r is merely proportional to the service level or is related to service level through some mapping. Also, it is understood that service level may itself be computed in various ways, including or excluding various characteristics.

Various parameters may be tuned to affect the performance of the learning process. A learning rate "α" is defined as a constant between zero and one that prescribes how much the value $Q^\pi(s, a)$ of a state-action pair is biased from the results of a single action. Higher learning rates enable a system to respond more quickly to changes than lower learning rates. A discount rate "Y" is defined as a constant between zero and one that prescribes the present value of future expected rewards. A discount rate of one means no discounting, whereas a discount rate of zero means that immediate rewards are maximized. As the discount rate approaches one, the technique becomes more farsighted and takes future rewards into account more strongly. A trace-decay "λ" is also defined as a constant between zero and one. In an example, the learning rate α is set to 0.1, the discount rate Y is set to 0.7, and the trace-decay λ is set to 0.2. It is understood that these values are merely examples, and that different parameter values may be used to tune the learning process as desired.

A time displacement (TD) error δ drives all learning. For any given play, the TD error is updated by the following equation:

$$\delta_t = r_{t+1} + YQ(s_{t+1}, a_{t+1}) - Q(s_t, a_t) \quad (5)$$

Thus, the TD error for time t is the reward at time t+1 plus the discounted value of the state-action pair at time t+1 minus the value of the state-action pair time t.

Further, an eligibility trace "e(s, a)" is associated with each state-action pair. For each play, if a state is visited and an action is taken, the value of the eligibility trace for that state-action pair is incremented by one. Eligibility traces essentially keep track of state-action pairs that are eligible for updating. The eligibility trace for state s and action a at time t is denoted $e_t(s, a)$. All eligibility traces decay at a rate of Yλ. In mathematical terms, $$e_t(s, a) = Y\lambda e_{t-1}(s, a) \text{ for } s \neq s_t, a \neq a_t, \text{ and}$$

$$e_t(s, a) = Y\lambda e_{t-1}(s, a) + 1, \text{ otherwise.}$$

Using the definitions and parameters set forth above, a complete SARSA implementation for selecting and rewarding selections of storage element types for the redundant group 160 can be realized with the following pseudo-code. In an example, this pseudo-code is executed by the constructs shown in FIG. 3.

{01} Initialize Q(s, a) to small numbers on the interval [−1, 1] using a random number generator for all states
{02} Initialize e(s, a) to 0 for all states
{03} Initialize s, a
{04} Repeat for each play
{05} Take action a, observe resultant state s' and reward r
{06} Choose a' using policy derived from Q
{07} δ=r+YQ(s', a')−Q(s, a)
{08} e(s, a)=e(s, a)+1
{09} For all states s, actions a
{10} Q(s, a)=Q(s, a)+αδe(s, a)
{11} e(s, a)=Yλe(s, a)
{12} s=s'
{13} a=a'

At line 1 of the pseudo-code, each value of Q(s, a) is initialized to a random number between negative one and positive one. Assuming 1000 possible states and L possible actions, line 1 involves initializing 1000*L different values of Q(s, a). It should be noted that random initialization is merely an example. Alternatively, values of Q(s, a) can be initialized to predicted values, to values observed on earlier learning trials, or to other values.

At line 2 of the pseudo-code, all eligibility traces e(s, a) are initialized to zero. Using the numbers above, a total of 1000*L values for eligibility traces are initialized.

At line 3, values of s and a are initialized. In an example, line 3 is executed in response to a first storage element failure in the redundant group 160. A storage element type (value of a) is selected (e.g., randomly), but no storage element replacement is yet made.

Line 4 indicates a series of steps that are repeated for each play, i.e., for each selection of a storage element type. At line 5, the action a (here, the storage element type selected at line 3) is put into effect, i.e., a storage element of the selected type is added to the redundant group 160. Sometime later, time the swap request signal 320 is asserted. The storage manager 130 then observes values of throughput, IOPS, and fault tolerance that have accrued since the last selection, i.e., the values that resulted from the action a. These values are taken to represent the resultant state, s'. Using EQ. (4), a new value of the reward r is computed based on the values of throughput, IOPS, and fault tolerance that make up the resultant state, s'.

At line 6, a new action a' is chosen. For example, the dynamic storage element selector 132 selects a storage element type (i.e., one of $E_1$ to $E_L$) using a random, biased selection process, similar to the one described above. As before, each storage element type is assigned a weight. Here, the weight of each storage element type "E" may be computed based on the sum of all $Q(s, a_E)$ across all values of s, where $a_E$ is the action of selecting the storage element type E. The computed sums for each action are then used to weight the random, biased selection process as described in the previous example, such that storage element types having higher weights will tend to be selected more often than storage element types having lower weights. The probability of selecting any storage element type E is thus proportional to the sum of all $Q(s, a_E)$ divided by the sum of all values of $Q(s, a)$.

According to one variant, the storage element type having the highest weight is chosen for some fixed percentage of selections, while the random, biased selection process is used for the remainder of selections. In one example, the storage element type having the highest weight is used for 70% of selections, with no variability, whereas random, biased selections are used for the remaining 30% of selections. Note that some of the random, biased selections will select the storage element type having the highest weight, such that the total number of selections of the storage element type with the highest weight is likely to be greater than 70%. The process of forcing the action with the highest weight to be selected for a high, fixed percentage of selections is known as "$\epsilon$-greedy" selection.

According to a further variant, the random, biased selection process is used for all selections, initially, but $\epsilon$-greedy selection is introduced after some initial learning period. Alternatively, fixed selections can be introduced at a low rate (e.g., for 10% of selections) after an initial learning period, and the rate can be increased over time. It is noted, however, that, while an $\epsilon$-greedy process may improve efficiency under any given set of circumstances, it also impairs the ability of the technique to recover quickly and to select a new storage element type if circumstances favoring the new storage element type should arise. Thus, it is not expected that optimal implementations will employ fixed selections at a rate above 90%.

The TD error is computed at line 7, and the eligibility trace for the current state-action pair is incremented at line 8.

Line 9 indicates a series of steps that are repeated for all states and actions. At lines 10 and 11, each value Q(s, a) and each value of e(s, a) for all s and all a is updated as indicated.

At steps 12 and 13, the current state s is assigned the value of s' (the current scored values of throughput, IOPS, and fault tolerance), and the current action a is assigned the value of the most recent storage element type selection, a'.

Control then returns to line 5, whereupon the action selected during the previous iteration of the loop is taken, i.e., the selected storage element type is added to the redundant group 160 and new values of performance metrics are accumulated. The next time the swap request signal 320 is asserted (or after some other defined interval), the storage manager 130 observes values of throughput, IOPS, and fault tolerance that have accrued since the last selection, i.e., the values that resulted from the action a. These values are taken to represent the resultant state, s'. Using EQ. (4), a new value of the reward r is computed based on the values of throughput, IOPS, and fault tolerance that make up the resultant state, s'. Operation continues in this matter indefinitely, with rewards steering future selections of storage element types toward more effective choices.

Figure 4:
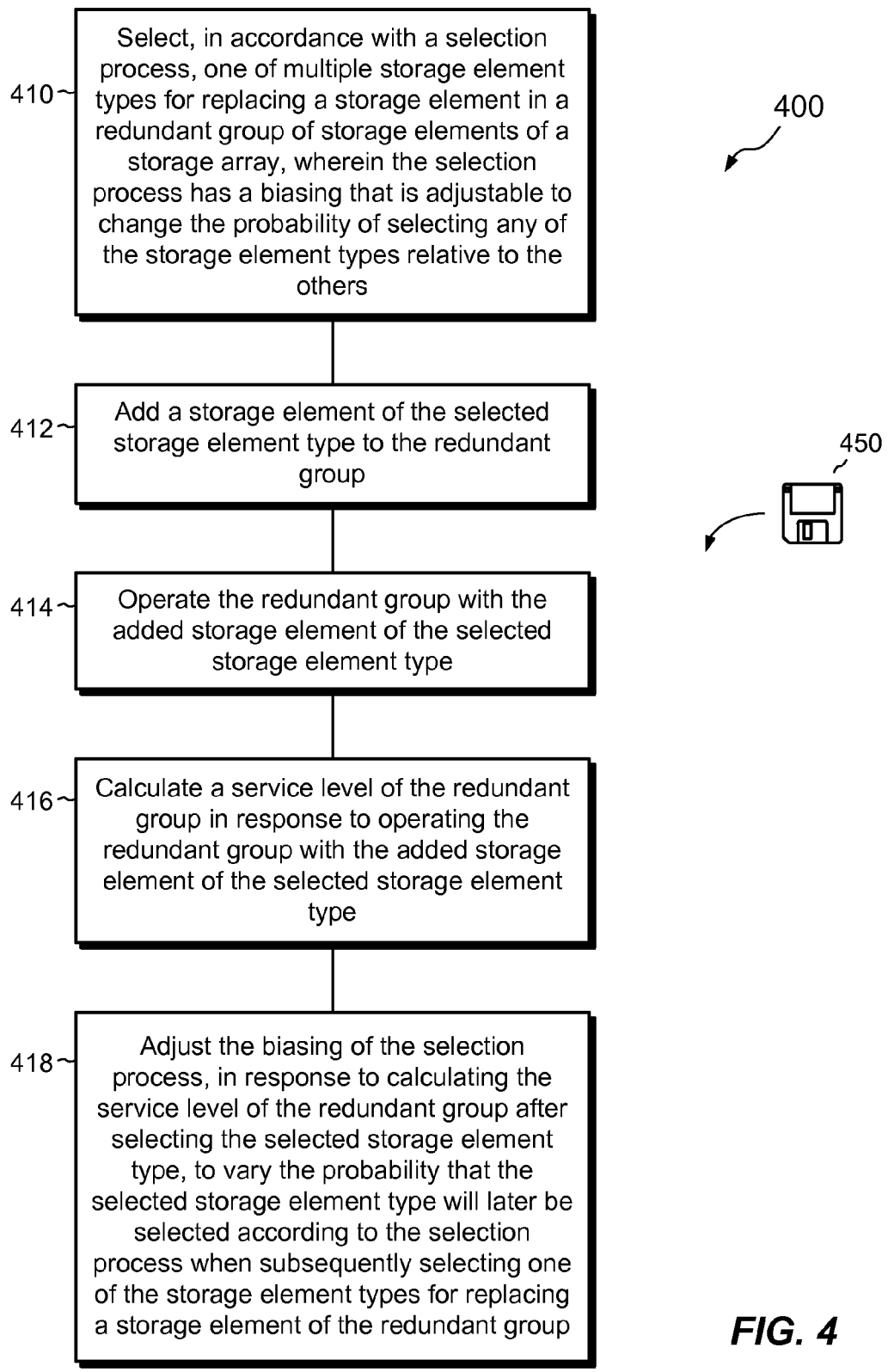
FIG. 4 is a flowchart showing an example process for replacing storage elements in the storage array of FIG. 1.

FIG. 4 shows an example process 400 for replacing storage elements in a storage array. The process 400 is typically carried out by the constructs described in connection with FIGS. 1-3, which reside in the memory 112 of the computing circuitry 100 and is run by the set of processors 110. The various acts of the process 400 may be ordered in any suitable way. Accordingly, embodiments may be constructed in which acts are performed in orders different from those illustrated, which may include performing some acts simultaneously, even though the acts are shown as sequential in the illustrated embodiments.

At step 410, one of multiple storage element types is selected for replacing a storage element in a redundant group of storage elements. For example, the dynamic storage element selector 132 selects one of the storage element types $E_1$-$E_L$ for replacing a faulty storage element in the redundant group 160. The selection is made in accordance with a selection process having a biasing that is adjustable to change the probability of selecting any of the storage element types relative to the others. For example, the storage element types $E_1$-$E_L$ have weights that bias selection by the dynamic storage element selector 132 such that the dynamic storage element selector 132 is more likely to select storage element types having higher weights than to select storage element types having lower weights. In some examples, the dynamic storage element selector 132 selects the storage element types having the highest weight a fixed percentage of the time (e.g., using an $\epsilon$-greedy selection process), and uses the random, biased selection process the remainder of the time.

At step 412, a storage element of the selected storage element type is added to the redundant group. For example, a spare storage element from a selected one of the groups 162, 164, 166, and 168 is added to the redundant group 160 in place of the faulty storage element.

At step 414, the redundant group is operated with the added storage element of the selected storage element type.

At step 416, a service level of the redundant group is calculated in response to operating the redundant group with the added storage element of the selected storage element type. For example, service level may be calculated based on metrics available from the array 102 and based on user-selected weights using Eq. (1), Eq. (3).

At step 418, the biasing of the selection process is adjusted, in response to calculating the service level of the redundant group cache after selecting the storage element type, to vary the probability that the selected storage element type will later be selected according to the selection process when subsequently selecting one of the storage element types for replacing a storage element in the redundant group. In one example, the biasing adjuster 340 applies a reward to the selected storage element type by increasing the weight associated with the selected storage element type in the record 310 of storage element types. As the weight of the selected storage element type increases, the probability of the selected storage element type being selected increases, so it is more likely to be selected going forward. In another example, values Q(s, a) of state-action pairs are updated in a SARSA $\lambda$ reinforcement learning implementation.

An improved technique has been described for replacing storage elements in a redundant group of storage elements of a storage array. The improved technique dynamically selects a storage element type from among multiple candidates based on which storage element type produces the greatest service level of the redundant group. The "service level" of the redundant group is a measure of its performance, fault tolerance, or a combination thereof. The technique includes selecting one of multiple storage element types using a random selection process that can be biased to favor the selection of certain storage element types over others. A storage element of the selected type is added to the redundant group. The redundant group is operated, and the service level of the redundant group is monitored. The selected storage element type is then rewarded based on the service level detected, i.e., a biasing of the selection process is modified to change the likelihood that the selected storage element type will again be selected in the future. The selection process is repeated, and a newly selected storage element type is put into use. Each time a new selection is made, the service level is monitored and the selected storage element type is rewarded in response to the service level that results. In this fashion, operation tends to converge on an optimal storage element type that maximizes the service level of the redundant group.

As used throughout this document, the words "comprising," "including," and "having" are intended to set forth certain items, steps, elements, or aspects of something in an open-ended fashion. Although certain embodiments are disclosed herein, it is understood that these are provided by way of example only and the invention is not limited to these particular embodiments.

Having described certain embodiments, numerous alternative embodiments or variations can be made. For example, although a SARSA λ implementation has been described, it is evident that a variety of other reinforcement learning techniques may be used, as well as other adaptive techniques, consistent with the teachings herein.

Further, although features are shown and described with reference to particular embodiments hereof, such features may be included in any of the disclosed embodiments and their variants. Thus, it is understood that features disclosed in connection with any embodiment hereof can be included as variants of any other embodiment hereof, whether such inclusion is made explicit herein or not.

Further still, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 450 in FIG. 4). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

Those skilled in the art will therefore understand that various changes in form and detail may be made to the embodiments disclosed herein without departing from the scope of the invention.

What is claimed is:

1. A method performed by a set of processors for replacing storage elements in a storage array, the method comprising:
    selecting, in accordance with a selection process, one of multiple storage element types for replacing a storage element in a redundant group of storage elements of the storage array, wherein the selection process has a biasing that is adjustable to change the probability of selecting any of the storage element types relative to the others;
    adding a storage element of the selected storage element type to the redundant group;
    operating the redundant group with the added storage element of the selected storage element type;
    calculating a service level of the redundant group in response to operating the redundant group with the added storage element of the selected storage element type; and
    adjusting the biasing of the selection process, in response to calculating the service level of the redundant group after selecting the selected storage element type, to vary the probability that the selected storage element type will later be selected according to the selection process when subsequently selecting one of the storage element types for replacing a storage element of the redundant group.

2. The method of claim 1, wherein the selection process operates in a random, biased manner wherein each of the storage element types is associated with a weight, and wherein the probability of selecting any of the storage element types when selecting a storage element type is proportional to the weight of the respective storage element type divided by the sum of the weights of all of the storage element types.

3. The method of claim 2, wherein adjusting the biasing of the selection process includes changing the weight of the selected storage element type in response to detecting that the service level changes after operating the redundant group with the added storage element of the selected storage element type.

4. The method of claim 3, wherein changing the weight of the selected storage element type includes ensuring that the probability of selecting any of the storage element types does not fall below a lower limit greater than zero.

5. The method of claim 4, wherein adjusting the biasing of the selection process includes applying a reward to the selected storage element type, and wherein the reward applied is greater when calculating a higher value of the service level than when detecting a lower value of the service level.

6. The method of claim 5, wherein selecting one of multiple storage element types and adjusting the biasing of the selection process are conducted in accordance with a SARSA λ reinforcement learning technique.

7. The method of claim 6, wherein calculating the service level is based on a fault tolerance of the redundant group and at least one of a throughput of the redundant group and a number of IOs per second (IOPS) of the redundant group.

8. The method of claim 7, further comprising defining a state space of the SARSA λ reinforcement learning technique to represent different levels of service level characteristics as different states.

9. The method of claim 8, wherein defining a state space of the SARSA λ reinforcement learning technique includes defining at least two dimensions of the state space, a first dimension representing different fault tolerance levels of the redundant group and a second dimension representing different levels of one of (i) the throughput of the redundant group or (ii) the number of IOPS of the redundant group.

10. The method of claim 8, wherein defining a state space of the SARSA λ reinforcement learning technique includes defining at least three dimensions of the state space, a first dimension representing different fault tolerance levels of the redundant group, a second dimension representing different levels of the throughput of the redundant group, and a third dimension representing different levels of IOs per second (IOPS) of the redundant group.

11. The method of claim 5, wherein calculating the service level is based on a fault tolerance of the redundant group and at least one performance measure of the redundant group.

12. The method of claim 11, further comprising receiving input from a user indicating the relative importance of fault tolerance of the redundant group to performance of the redundant group, wherein the reward applied to the selected storage element type is based on the received input and on the performance and fault tolerance of the redundant group.

13. The method of claim 12, wherein the at least one of a performance measure of the redundant group includes a throughput of the redundant group and a number of IOPS of the redundant group, and wherein the method further comprises receiving additional input from a user indicating the relative importance of throughput of the redundant group to the number of IOPS of the redundant group, wherein the reward applied to the selected storage element type is further based on the received additional input and on the throughput and IOPS of the redundant group.

14. Computing circuitry for managing data replacement in a cache, comprising:
  a set of processors; and
  memory, coupled to the set of processors, the memory constructed and arranged to store instructions executable by the set of processors,
  wherein the set of processors executing instructions from the memory forms a controller constructed and arranged to:
    select, in accordance with a selection process, one of multiple storage element types for replacing a storage element in a redundant group of storage elements of the storage array, wherein the selection process has a biasing that is adjustable to change the probability of selecting any of the storage element types relative to the others;
    add a storage element of the selected storage element type to the redundant group;
    operate the redundant group with the added storage element of the selected storage element type;
    calculate a service level of the redundant group in response to operating the redundant group with the added storage element of the selected storage element type; and
    adjust the biasing of the selection process, in response to calculating the service level of the redundant group after selecting the selected storage element type, to vary the probability that the selected storage element type will later be selected according to the selection process when subsequently selecting one of the storage element types for replacing a storage element of the redundant group.

15. The computing circuitry of claim 14, wherein the calculated service level is based on a fault tolerance of the redundant group and at least one of a performance measure of the redundant group.

16. The computing circuitry of claim 15, wherein, when constructed and arranged to adjust the biasing of the selection process, the controller is further constructed and arranged to apply a reward to the selected storage element type.

17. The computing circuitry of claim 16, wherein the controller if further constructed and arrange to receive input from a user indicating the relative importance of fault tolerance of the redundant group to performance of the redundant group, wherein the reward applied to the selected storage element type is based on the received input and on the performance and fault tolerance of the redundant group.

18. A non-transitory computer-readable medium including instructions which, when executed by a set of processors of computing circuitry, cause the set of processors to perform a method for managing data replacement in a cache, the method comprising:
  selecting, in accordance with a selection process, one of multiple storage element types for replacing a storage element in a redundant group of storage elements of the storage array, wherein the selection process has a biasing that is adjustable to change the probability of selecting any of the storage element types relative to the others;
  adding a storage element of the selected storage element type to the redundant group;
  operating the redundant group with the added storage element of the selected storage element type;
  calculating a service level of the redundant group in response to operating the redundant group with the added storage element of the selected storage element type; and
  adjusting the biasing of the selection process, in response to calculating the service level of the redundant group after selecting the selected storage element type, to vary the probability that the selected storage element type will later be selected according to the selection process when subsequently selecting one of the storage element types for replacing a storage element of the redundant group.

19. The non-transitory computer-readable medium of claim 18, wherein selecting one of multiple storage element types and adjusting the biasing of the selection process are performed in accordance with a SARSA $\lambda$ reinforcement learning technique.

* * * * *